United States Patent [19]

Welker

[11] 4,354,661

[45] Oct. 19, 1982

[54] CONSTANT VELOCITY DIFFUSER

[76] Inventor: Robert H. Welker, P.O. Box 138, Sugar Land, Tex. 77478

[21] Appl. No.: 205,287

[22] Filed: Nov. 10, 1980

[51] Int. Cl.³ .............................................. F16K 31/12
[52] U.S. Cl. ..................................... 251/118; 138/46; 251/63.5
[58] Field of Search .......................... 137/219; 138/46; 251/63.5, 118, 356

[56] References Cited

U.S. PATENT DOCUMENTS

| | | | |
|---|---|---|---|
| 2,917,269 | 12/1959 | Welker | 251/63.5 |
| 3,015,469 | 1/1962 | Falk | 138/46 X |
| 3,368,787 | 2/1968 | Sachnik | 251/63.5 |
| 3,380,470 | 4/1968 | Culpepper | 251/63.5 X |
| 3,746,300 | 7/1973 | Welker | 251/63.5 |
| 4,206,902 | 6/1980 | Barthel | 251/63.5 X |

*Primary Examiner*—Robert G. Nilson

*Attorney, Agent, or Firm*—Gunn, Lee & Jackson

[57] ABSTRACT

In a flow regulator, the illustrated and preferred embodiment incorporates an expandable inner valve structure formed of a resilient material which expands radially outwardly to controllably choke flow through the valve, the flow regulator positioned immediately adjacent to the encircling tubular sleeve. The tubular sleeve controllably passes gas flowing through the regulator at a rate dependent on the radial expansion of the inner valve. Moreover, the improved version disclosed herein incorporates a transverse support plate for the tubular sleeve and the inner valve structure centered thereon. The support plate is drilled with a number of passages which distribute the gas flowing through the tubular sleeve across the cross-section of the downstream connected pipe thereby spreading the flowing gas to reduce downstream turbulence.

9 Claims, 6 Drawing Figures

CONSTANT VELOCITY DIFFUSER

BACKGROUND OF THE DISCLOSURE

A flow regulator is a device which modulates the rate of flow of liquid or gas in a pipeline. The gas typically is natural gas. The flow regulator is installed to reduce relatively high pipeline pressure to a reduced level. One such flow regulator is disclosed in U.S. Pat. No. 2,917,269 of the present inventor. The flow regulator worked well in the industry. This apparatus is directed to an improved version of equipment for the flow regulator. The improvement is directed to the downstream diffuser.

When a flow regulator is installed in a pipeline, it creates a significant amount of turbulence due to boundry layer separation. The gas flow is diverted into an annular flow by the imposition of the flow regulator body in the pipeline. This forms an annular flume with a central dead space immediately downstream from the flow regulator. The central dead space, being on the downstream side, tends to draw a significant portion of the flowing gas back on itself after passing through the regulator to thereby initiate eddy currents immediately downstream of the regulator. When such downstream eddy flows are formed, they fill the dead space and even degrade the high velocity flume that surrounds the dead space in the annular flow path. Eddy flows at the vortex consume energy which is converted to heat.

Throughput capacity of a flow regulator is, in part, limited by the velocity of the gas flowing through the regulator. This can hardly be increased inasmuch as gas velocity is a function of several factors but is primarily limited at a maximum equal to sonic velocity. Flow capacity is often seriously limited by downstream turbulence. The turbulence which occurs is, in part, a result of the flowing gas redistributing across the width of the downstream pipe section. Such turbulence thereby compounds annular limitation on the total throughput permissible with the flow regulator. It has been observed that any increase in downstream turbulence thus reduces the total throughput of the valve. Downstream energy wastage cannot be overcome, as, for instance, by decreasing line pressure downstream of the flow regulator.

The flow regulator also creates noise. The noise level is raised as turbulence increases. The present invention has the virtue of reducing noise by reducing turbulence. This reduces the amount of horsepower required to keep the product flowing through the line.

In addition to reducing the noise level, a reduction in turbulence increases recovery or the total throughput of the valve. Turbulence reduces recovery becauses it takes energy to keep a vortex created by the turbulence in motion. The converting of velocity energy (kenetic energy) back into pressure (potential energy) increases recovery. This is accomplished by a feature of the invention whereby turbulence is reduced to the extent that recoveries in the range of 80%-90% are possible.

The features described above are obtained in the flow regulator of the disclosure by a construction utilizing a transverse plate adapted to be clamped between a pair of flanges. The plate suports an upstanding tubular sleeve on the exterior of a centralized plug. The centralized plug supports an expandable inner valve. An annular space adjacent to the inner valve is incorporated, the gas flowing through the annular space. The transverse plate is drilled with a number of openings. The several drilled openings are located at the termination of the annular space downstream from the inner valve, the transverse plate being drilled with two or more sets of passages. They all extend to the annular space whereby the stream of flowing gas is picked up and distributed on passing through the several passages. The several passages have inlets collectively receiving the flow. The several passages outlet through the downstream face of the transverse plate, and they are directed so that a portion of the gas flows to the center axis of the pipe while another portion is directed toward the periphery. Collectively, the several passages have a cross-sectional area which enables the annular flow of gas to expand after regulation as velocity drops, and the passages are direted so that a fairly uniform wave front across the cross-section of the pipe occurs immediately downstream. One feature of this apparatus is that the inlets for the several passages divide and distribute the gas through the valve in the desired manner.

Another important feature of the present invention is the distribution of flowing gas toward the center line of the pipe downstream to reduce unwanted eddy flow, and thereby modify turbulence and noise. Turbulence and noise are both reduced.

one of the advantages of the present invention is the ability of the apparatus to pick up an annular flow of gas and convert the annular flow of gas into a wave front downstream from the regulator which is fairly well distributed across the cross-sectional area of the downstream pipe to smooth the transition with a reduction in turbulence and noise. An important factor regarding the present invention is the ability of the apparatus to match the flow capacity of the flow regulator immediately adjacent to the expandable element which achieves modulated flow with the downstream handling capacity. In other words, the flow regulator passes the maximum capacity of gas for a given size or design through the flow regulator with no need to operate the flow regulator in a derated manner as a result of downstream turbulence and the like.

With the foregoing in mind, the apparatus of the present invention is summarized as a flow regulator having a resilient or expandable central plug or element. This comprises a valve element or expandable body. It is captured between end faces on a stem so that compression thereof will expand the body radially outwardly. Expansion restricts an annular passageway within a sleeve which fits around the body. The sleeve defines a lengthwise annular passage through the apparatus surrounding the regulator valve element. This passage terminates at a transverse plate. The transverse plate is drilled with several passages. The several openings are formed in groups of two or more, the first group comprising a set of drilled holes through the transverse plate which define a circle and which open at the outlet or back end to direct flowing gas in laminar fashion along the walls of the downstream pipe. The second set of openings extend through the plate and open towards the center line axis of the downstream pipe. The second set of openings direct regulated gas toward the center of the pipe. They modify the downstream flume and thereby reduce or eliminate eddy flows. Moreover, they form a more uniform wave front downstream of the equipment.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of scope, for the invention may admit to other equally effective embodiments.

DETAILED DESCRIPTION OF THE INVENTION

Figure 1:
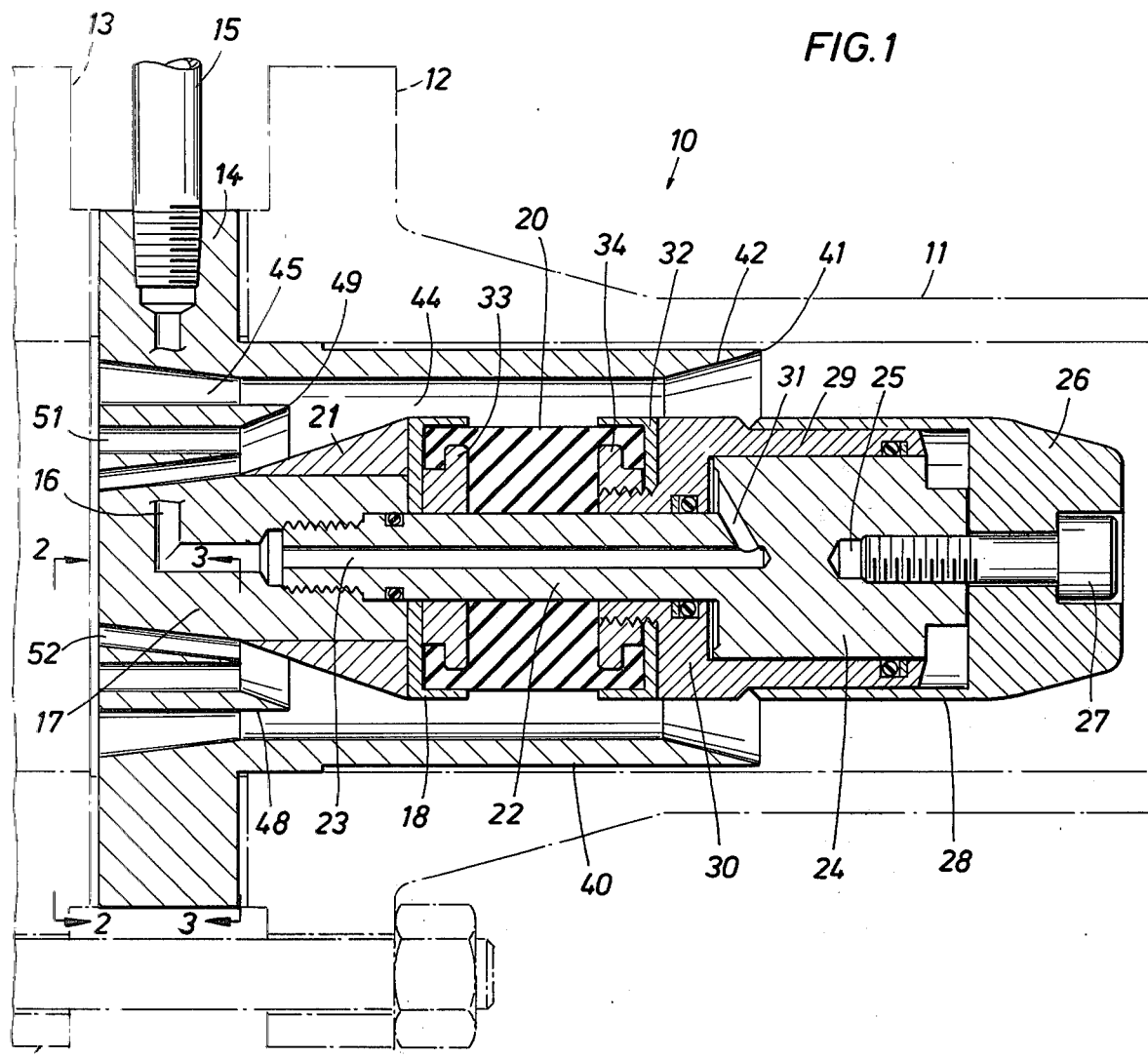
FIG. 1 is a longitudinal sectional view through the flow regulator of the present invention particularly showing details of construction of the passages therethrough for the regulated gas flow and particularly illustrating passages which redirect the downstream flume of regulated gas flow.

Attention is first directed to FIG. 1 of the drawings. In FIG. 1, the numeral 10 identifies the flow regulator of the present invention. It is shown in full line in the drawing. The numeral 11 identifies a pipe which is shown in dotted line. The pipe is support structure, illustrating the environment in which the flow regulator 10 is installed. The context or setting for the apparatus will be described first. To this end, the pipe 11 terminates at a flange plate 12. The flange plate 12 serves as a clamp to secure the flow regulator 10 in location. The pipe 11 has a specified internal diameter while the flange plate 12 has a specified rating also. The flange plate 12 is immediately adjacent to a second flange plate 13. The flange plate 13 is constructed and arranged to capture the flow regulator 10 adjacent to it and against the flange plate 12. The flange plate 13 connects with another pipe (not shown) which extends further downstream, the two pipes preferably being of identical diameter. The upstream high pressure gas flow is from the right or upstream side of the flow regulator 10 and the regulated or reduced gas flow moves to the left as viewed in FIG. 1. This is achieved through operation of the flow regulator 10.

In FIG. 1, the flow regulator is constructed with a flange disk 14. The flange plate 14 is a transverse flat plate. It is positioned between the flange plates 12 and 13 and is sealed to them by means of suitable seals placed between them. The flange plate 14 is a means of anchoring and fastening the flow regulator 10 in location. It is captured between the plates and held securely by nuts and bolts as are illustrated in dotted line in FIG. 1. The flange plate 14 has an exposed peripheral face and a tapped opening is formed therein to receive a hydraulic fluid conduit 15. It connects through a passage 16. The passage 16 penetrates through the flange plate toward the center line of the flange plate and turns axially upstream of the apparatus. The flange plate 14 has a central enlargement or sub 17. The sub 17 is a generally cylindrical enlargement attached to it and extends toward the upstream side. It terminates at a cup 18. The cup 8 encompasses one end of an inner valve element 20. The inner valve element 20 is a cylindrical plug of rubber having a resiliency enabling it to swell and expand on compression. The plug 20 is formed of rubber, and has a durometer in the range of 30 to 90. The cup 18 is a transverse plate which has a peripheral lip around it which laps over the end of the resilient plug 20. The sub 17 supports a tapered sleeve 21. The sleeve 21 is on the exterior and fairs the flow path around the sub as will be described.

The sub 17 is drilled and counterbored. An elongate rod 22 is threaded into the counterboard central opening, and this defines an extension of the passage 16 which is identified by the numeral 23. The rod 22 is enlarged at 24, the enlargement 24 comprising a fixed piston. The piston is fixed in position inasmuch as the rod 22 is threaded to the sub 17 and held firmly thereagainst. The fixed piston 24 is axially drilled at 25, and a nose cone 26 is threaded to it by means of a bolt 27. The bolt is received into the tapped hole 25. The nose cover 26 defines a sheltered or covered cavity, the nose cone 26 incorporating a cylindrical skirt 28. The skirt 26 fits concentrically about a sleeve 29. The sleeve 29 fits around the fixed piston 24. The sleeve 29 moves to the left in conjunction with cylinder head 30. The cylinder head 30 is attached to the sleeve 29. A chamber is defined between the piston 24 and the head 30. The chamber is defined between the facing shoulders and a lateral passage 31 communicates to the chamber from the axial passage 23. Hydraulic oil introduced under pressure flows from the line 15 through the passage 16 and to the extension thereof at 23. The oil then flows through the lateral passage 31 into the chamber provided for it. Under pressure, the chamber is expanded. The solid piston 24 cannot move. The cylinder head 30 moves to the left as viewed in FIG. 1. As it moves, it slides on the rod 22. Movement of the cylinder head 30 is coupled by a second cup 32, the cups 18 and 32 being similarly constructed. They face one another and have external lips which surround the ends of the resilent body 20. This controls the portion of the body 20 which expands and directs expansion to the central portions thereof. If helps anchor the plug 20 in position.

The plug 20 is held in position by additional devices which anchor the ends of the plug. Specifically, each end of the plug is constructed by integrally bonding the plug during fabrication to transverse plates having protruding lips, the two plates being identified by the numerals 33 and 34. They are parallel to one another and spaced from one another. They are telescoped around the rod 22 to permit them to move toward one another on compression of the plug 20. It will be appreciated that movement is initiated from the right toward the left and expansion occurs in the central portions of the plug. Moreover, the compression impinging on the right hand end of the plug 20 is symmetrically reflected by expansion around the exterior. The plug 20 is held in position and maintains its desired or true shape when relaxed in large part assisted by the overhanging lips 33 and 34 which are cast integrally within the plug body.

As described to this juncture, hydraulic oil is delivered to the tool to achieve expansion of the resilient plug 20. The plug 20 swells radially outwardly around its circumference.

The flange plate 14 supports a large concentric sleeve 40. The sleeve 40 is positioned adjacent to and roughly parallel to the plug 20. It terminates at a leading edge 41. This connects adjacent to and flows into a tapered surface 42, thereby delivering gas in laminar flow into an annular passage 44. The annular space 44 is inside the sleeve 40 and on the exterior of the plug 20. The resilient plug is able to expand and restrict the annular flow space 44. This restriction is controlable inasmuch as the size of the plug is controlable. Regulation is achieved by this equipment in this manner.

As gas flows past the plug 20 upon its expansion, the gas then moves downstream. The faired sleeve 21 enlarges the gas flow volume in the annular space 44 as it moves to the left. The numeral 45 identifies one of many passages drilled through the flange plate 14. They are preferably tapered, and are larger at the outlet end 45 as better shown in FIG. 2. This enables some expansion of the gas as it flows along the passage 45. The passges 45 are shown as holes in the drawings for illustrative purposes only. Other shapes, such as slots, may also be drilled through the flange plate 14. Moreover, the several passages 45 are arranged on a common circle. They are preferably identical and preferably evenly spaced around the circle. This distributes a laminar flow front next to the pipe wall downstream from the flange plate 14. The several passages are relatively close together so that a full circle may well include between 20, 30 or more drilled holes 45. The specific number of holes 45 may vary depending on the size of the holes and the area available on the flange plate 14. The drilled holes terminate at the downstream face of the plate so that the gas is unrestricted after it passes through the passages 45. The upstream end of the passage 45 is shown better in FIG. 3. There, it will be observed that the sectional line of FIG. 3 passes through the wall of the sleeve 40 parallel to the disk 14, thereby identifying a shoulder 47 inside the sleeve 40. The shoulder 47 is drilled at spaced locations with the several holes 45. The shoulder 47 terminates at an upstanding edge 48 shown in FIG. 3. The edge 48 is better shown in FIG. 1 of the drawings where it extends forwardly at a relatively sharp angle to form a very sharp edge 49. The edge 49 is the terminus of a tapered face which extends down to a second circular shoulder 50. In this portion of the flow regulator 10, the gas flow stream is split by the upstanding edge 48 and directed through the passages drilled through the flange plate 14. Thus, the edge 48 functions as a flow splitter. The edge 48 is provided with the sharp edge 49 to insure minimum boundary layer separation when the gas flow stream is split.

Figure 2:
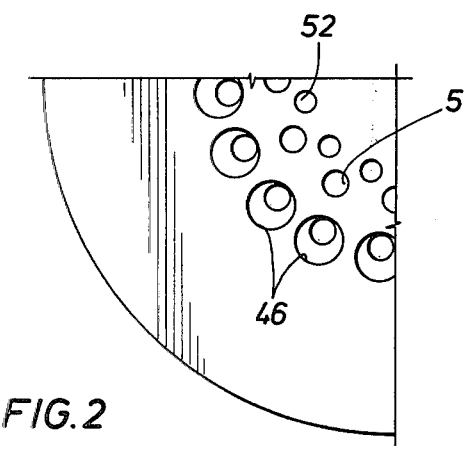
FIG. 2 is a sectional view along the line 2—2 of FIG. 1 which shows the arrangement of the outlets of the several passages through the flow regulator.
Figure 3:
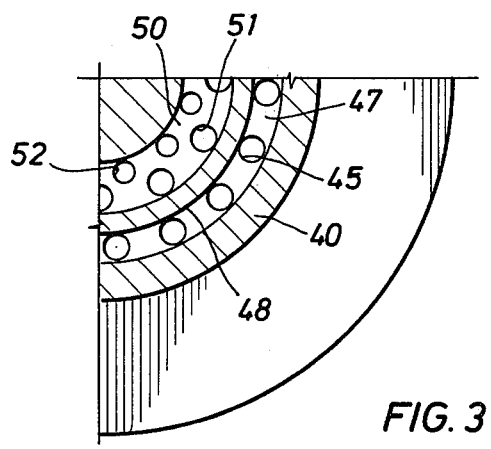
FIG. 3 is a sectional view looking along the line 3—3 of FIG. 1 which particularly illustrates the plurality of passages at the inlet end.

The shoulder 50 is better shown in FIG. 3. Morever, the shoulder 50 is drilled with many passages there being an outer set of openings at 51. A second and smaller set of passages is identified at 52. The passages 51 are relatively large in diameter compared with the passages 52. This is better illustrated in FIG. 1. There, the passages 51 extend approximately parallel to one another through the plate 14 and emerge on the downstream side. They collectively form a circle which is smaller than the circle of passages 45. They direct a flow of gas toward the center of the downstream pipe and thereby fill the central portions of the downstream flume to reduce eddy flows. The passages 52 converge at a downstream point. They direct gas flow toward the center line path or axis. The passages 52 collectively come together if extended. This convergence of the several passages fills the central portions of the downstream pipe immediately behind the flange plate 14 to prevent eddy flow formation and to reduce downstream turbulance. As described to this juncture, the flange plate 14 includes the three sets of passages drilled in it. More or fewer sets of passages may be drilled through the flange plate 14 depending on the size of the passage and the surface area of the flange plate. Three sets are described herein for illustrative purposes only. The three sets of passages are included to pick up different portions of the gas flow and to deliver these portions of gas flow to different parts of the cross-sectional area of the downstream pipe. The bulk of the gas may very well flow through the passages 45 but that is not the end of the matter. The central portion of the cross-sectional area is filled with gas flow. The passages 51 and 52 achieve this distribution. Moreover, the several sets of passages, being in the form of three circular groups of distributed passages, reduce downstream noise, and thereby smoothly carry the regulated gas flow away from the flange plate 14. This is better illustrated on referring to FIGS. 2 and 3. The manner in which this is accomplished will be understood more readily on viewing these drawings, to-wit: they illustrate a means whereby downstream gas flow distribution is accomplished.

Figure 4:
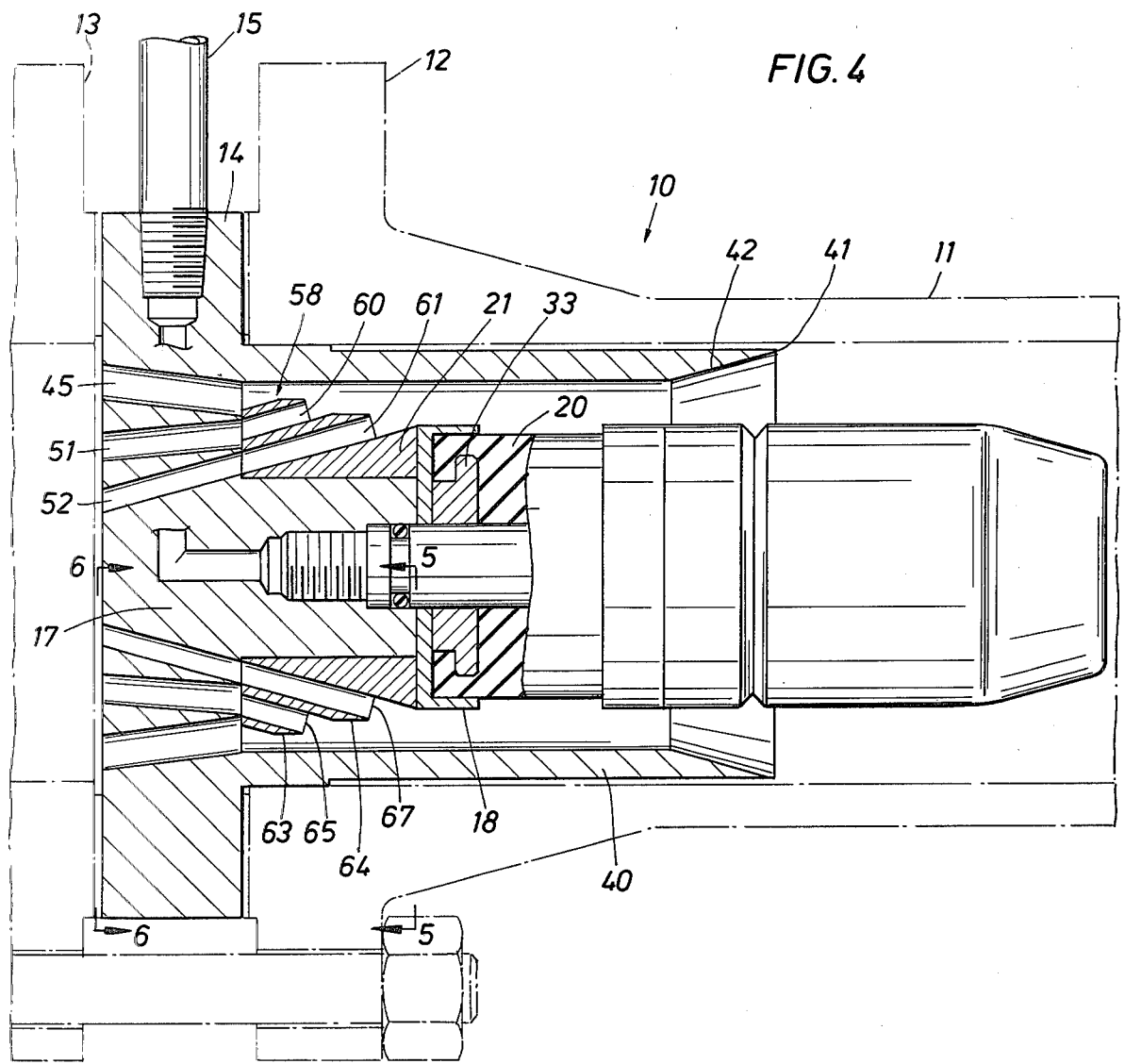
FIG. 4 is a longitudinal sectional view through an alternate embodiment of the flow regulator of the present invention particularly showing details of construction of the passages therethrough for the regulated gas flow and particularly illustrating passages which redirect the downstream flume of regulated gas flow.
Figure 5:
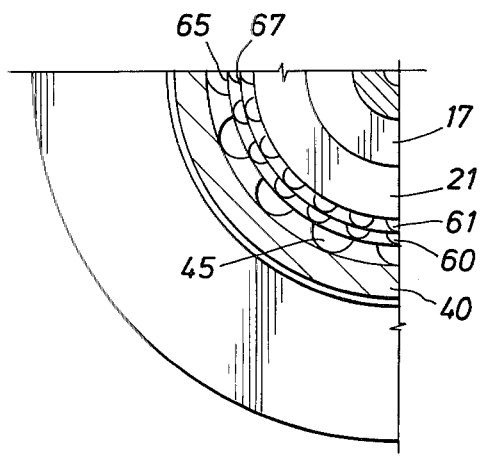
FIG. 5 is a sectional view along the line 5—5 of FIG. 4 which particularly illustrates the plurality of passages at the inlet end.
Figure 6:
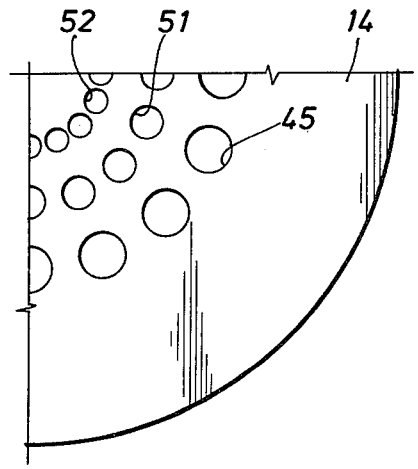
FIG. 6 is a sectional view looking along the line 6—6 of FIG. 4 which shows the arrangement of the outlets of the several passages through the flow regulator.

Turning now to FIGS. 4–6, an alternate embodiment of the flow regulator is disclosed. In the alternate embodiment, like reference numerals are used to identify like elements disclosed in FIGS. 1–3. In the embodiment of FIGS. 1–3, the flow splitter is shown as an integral part of the flange plate 14. This configuration is particularly suited for the flow regulators utilized in smaller size pipe, for example, a two inch size or smaller flow splitter. For the larger flow regulators, four to eight inch size, it is more economical to incorporate the flow splitter with the removable sleeve 21.

Referring particularly to FIG. 4, it will be observed that the flow splitter 58 includes a plurality of passages 60 and 61 drilled therethrough. The passages 60 and 61 are in substantial alignment with the passages 51 and 52 extending through the flange plate 14. It will additionally be observed that the flow splitter 58 incorporates two upstanding surfaces 63 and 64, one spaced above the other. The surfaces 63 and 64 extend forwardly at an angle to form sharp edges 65 and 67, respectively. While the surfaces 63 and 64 extend forwardly at an angle relative to the flow splitter 58, the surfaces 63 and 64 are parallel to the gas flow path. The sharp edges 65 and 67 insure that gas flow is split or shaved off with a minimum of boundary layer separation.

In operation, this structure is installed in a pipeline of specified rating. The device is installed between flange plates and left as a permanent regulatory apparatus. The installed flow regulator is operated by hydraulic pressure through the line 15. The oil is regulated to a specified pressure to vary the expansion of the resilient plug 20. When the pressure is elevated, the hydraulic oil is delivered against the cylinder head 30 to force it to the left in FIG. 1, and the plug 20 is expanded. The plug 20, on expansion, restricts the gas flow through the annular flow space 44. The restricted flow is regulated to the desired flow volume. The restricted gas moves past the regulator 10, and begins to expand as the annular flow space increases in cross-sectional area. The gas flow is then delivered to the three sets of passages through the flange plate 14. The three sets of passages distribute the flow downstream to reduce turbulance. At least 30 to 40% of the gas is split or shaved off to blow off the vortex which is created immediately downstream of the flange plate 14. Moreover, the passages reduce noise as a result of the more uniform wave front of gas flowing downstream.

While the foregoing is directed to the preferred embodiment of the present invention, other and further embodiments of the invention may be devised without departing from the basic concept thereof, and the scope thereof is determined by the claims which follow.

I claim:

1. A gas line flow regulator which comprises:
   (a) a flange supported, radially extending disk located within a pipeline having upstream and downstream faces thereon;
   (b) a centrally positioned means supported by said disk on the upstream side thereof, said means including:
      1. an elongate centered body;
      2. a resiliently expandable means supported by said body having a relaxed and expanded condition wherein the expanded condition is accompanied by a radial outward expansion of said expandable means, and wherein said expandable means further includes;
      3. an exposed outer sealing surface thereon;
   (c) a sleeve supported by said disk on the upstream side thereof, said sleeve surrounding said expandable means to define an annular flow space therebetween variably constricted by said expandable means on expanding and said sleeve further including an encircling tapered surface terminating at a leading edge for directing flowing gas in laminar flow into said annular flow space; and
   (d) said disk extending across the annular flow space and terminating said flow space and having openings therethrough, there being a first opening means for directing flowing gas in a first direction downstream from said disk and a second opening means therethrough for directing flowing gas in a second direction downstream from said disk.

2. The apparatus of claim 1 wherein said disk is a solid transverse plate including first and second sets of openings therein wherein said first set of openings comprises a plurality of holes formed therethrough and arranged on a common circle, and wherein said second set of openings comprise a plurality of holes formed therethrough and arranged on a second circle which is larger than the first circle, and said first set of openings is directed toward a point of intersection which, if extended downstream of said disk, would intersect within the second circle.

3. The apparatus of claims 1, or 2, wherein said expandable means is located upstream of said first and second opening means and wherein said annular flow space expands in cross-sectional area to direct gas flow into said first and second opening means.

4. The apparatus of claim 1 wherein said disk incorporates first, second and third opening means therethrough, wherein said first, second and third opening means are arranged progressively outwardly from the center of said disk, and which open on the downstream face of said disk.

5. The apparatus of claim 4 including third opening means through said disk which expand at the downstream face thereof in comparison with the upstream face thereof.

6. The apparatus of claim 5 including an encircling transverse shoulder at least partially terminating said annular flow space and wherein said third opening means terminate at said shoulder.

7. The apparatus of claim 1 including an encircling upstanding edge located on the upstream face of said disk, said edge including an encircling tapered face terminating at a sharp leading edge for splitting the flowing gas with a minimum of boundary layer separation.

8. The apparatus of claim 1 including a flow splitter supported by said body of said centrally positioned means, said flow splitter incorporating a plurality of passages drilled therethrough, which passages are in substantial alignment with a plurality of the openings extending through said disk.

9. The apparatus of claim 8 wherein said flow splitter further includes spaced, upstanding surfaces extending forwardly on the upstream surface of said flow splitter, said surfaces terminating at sharp leading edges for splitting the flowing gas with a minimum of boundary layer separation.

* * * * *